(12) United States Patent
Hodrinsky et al.

(10) Patent No.: US 11,413,522 B1
(45) Date of Patent: Aug. 16, 2022

(54) CLICKER MECHANISM FOR A VIDEO GAME CONTROLLER

(71) Applicants: Todd Hodrinsky, Mansfield Center, CT (US); Tyler Hodrinsky, Mansfield Center, CT (US)

(72) Inventors: Todd Hodrinsky, Mansfield Center, CT (US); Tyler Hodrinsky, Mansfield Center, CT (US)

( * ) Notice: Subject to any disclaimer, the term of this patent is extended or adjusted under 35 U.S.C. 154(b) by 0 days.

(21) Appl. No.: 17/214,394

(22) Filed: Mar. 26, 2021

(51) Int. Cl.
*A63F 13/24* (2014.01)

(52) U.S. Cl.
CPC .................................. *A63F 13/24* (2014.09)

(58) Field of Classification Search
CPC ... A63F 13/24; A63F 2300/1043; A63F 13/98
See application file for complete search history.

(56) References Cited

U.S. PATENT DOCUMENTS

| | | | | |
|---|---|---|---|---|
| 6,191,774 | B1 * | 2/2001 | Schena | G01B 5/008 345/163 |
| 10,775,125 | B1 * | 9/2020 | Owen, Jr. | F41A 33/00 |
| 10,857,454 | B2 * | 12/2020 | Burgess | A63F 13/24 |
| 2010/0298053 | A1 * | 11/2010 | Kotkin | A63F 13/24 463/37 |
| 2012/0244944 | A1 * | 9/2012 | Kotkin | A63F 13/24 463/38 |
| 2015/0072790 | A1 * | 3/2015 | Kotkin | A63F 13/837 463/38 |
| 2020/0016484 | A1 * | 1/2020 | Guerrero, Jr. | G05G 5/06 |
| 2020/0330858 | A1 | 10/2020 | Hodrinsky et al. | |

FOREIGN PATENT DOCUMENTS

CA   2932358 A1 * 12/2016 ............. A63F 13/98

OTHER PUBLICATIONS

Poster presented at CT Invention Convention, May 4, 2019.

* cited by examiner

*Primary Examiner* — James S. McClellan
*Assistant Examiner* — Peter J Iannuzzi
(74) *Attorney, Agent, or Firm* — Wiggin and Dana LLP; Brian A. Pattengale (57) ABSTRACT

A clicker toggle mechanism for a game controller is disclosed. The clicker toggle mechanism comprises a lever arm member and a barrel guide system. A screw member is threaded and affixed at a top portion of the lever arm member for adjusting and controlling the pull distance. The barrel is connected and extends through the bottom portion of the lever arm member. A clicker or toggle device is disposed underneath the device and locked in place with snaps. A toggle or clicker stopper screw barrel stopper pin at another end which is affixed to an armature to limit trigger or button pull distance. A clicker toggle connects to a bottom portion of the lever arm member, wherein the clicker toggle is pressed downwards to create a rotational force on the cam which locks in more than one position. The mechanism can be turned on and off during gameplay to allow unrestricted or restricted motion as needed. The barrel stopper pin guide, screw and clicker toggle mechanism can be completely removed as required by the user. The arms activate buttons located on the top of the controller when extending in the opposite direction. This eliminates the need for the user to use their thumbs to activate the buttons located on the top of the device.

12 Claims, 11 Drawing Sheets

CLICKER MECHANISM FOR A VIDEO GAME CONTROLLER

BACKGROUND

Field of Invention

The invention generally relates to a clicker toggle mechanism for a controller. More specifically, the invention relates to a clicker toggle mechanism to operate one or more buttons of the controller with detachable levers for maximum control over the operation of the video game.

Description of Prior Art

There are various types of gaming controllers available for operating a video game. However, the gaming market has witnessed a very limited number of inventions aiming to solve the issue of the inability of differently abled gamers to operate physical buttons and triggers, which are uniformly designed for the general mass and often ignore the special requirements of the said class of gamers. Additionally, even able-bodied gamers often face challenges in the trigger control because of inadequate factory designed trigger mechanisms that results in a disadvantage in the video games response time and requiring player input.

Most known game controllers include a type of actuator system for controlling the functions of the video games. Actions in video games such as attacking, firing and the like involve the use of manually operable devices like actuators, among others. Such buttons or actuators are referred to as triggers.

The ever-expanding gaming industry and the resultant improvement of games demanding player inputs, gaming circumstances often make it desirable for players to have customizable controllers to gain increased control over their game and reduce their reaction times. However, the existing controllers have not met the requirement of easily accessing small buttons on the controller, thereby hindering the smooth operation of the game, and causing a disadvantage in video games. Further, the limitations of the human hand require, the user to release some buttons or keys to actuate others. This diminishes the player's potential to control the game to the best of the user's ability. Often during a game, a trigger is pushed much further inwards than needed thereby wasting movement of the fingers and thus increasing reaction time.

In order to mitigate the above-mentioned issues existing in controllers of the prior art, there is a need to provide a clicker toggle mechanism for making the buttons of the controller more accessible to the user with the use of detachable levers and allows maximum control over the operation of the video game and maximum flexibility to the user. There is also a need to provide a clicker toggle mechanism for the controller with a controller interface consisting of external trigger control that allows faster response time. The clicker toggle mechanism is configured to increase control in a myriad of gaming situations during gameplay. This also makes it possible for differently abled gamers to customize their controller to their best advantage and ease of use.

SUMMARY OF THE INVENTION

The invention comprises of a clicker toggle mechanism to operate one or more buttons of the controller with detachable levers for maximum control over the operation of the video game.

In one variation, the clicker toggle mechanism is securely affixed to adjustable levers of the housing unit on both sides of a game controller or joystick via attaching members. In one variation, the housing unit is securely mounted on a game controller or joystick along the respective position of one or more detachable and customizable levers in relation to the buttons and triggers of the game controller. In one variation, the clicker toggle mechanism is configured to make the buttons and triggers of the game controller more accessible to a user with the use of detachable levers. In one variation, the clicker toggle mechanism is further configured to prevent accidental activation of the levers or arms by the user while playing or when placing the device on a flat surface. In one variation, the entire clicker toggle mechanism can be optionally removed if not desired.

In one variation, the clicker toggle mechanism further configured to prevent excessive motion of the user's fingers while using the game controller. In one variation, the clicker toggle mechanism comprises a lever arm. An adjustable screw member is securely affixed to the lever arm of the housing unit of the game controller. In one variation, a screw member is movable and threaded to a top portion of the lever arm. The screw member is configured to move outward and inward from the toggle shaped member. In one variation, the clicker toggle mechanism further comprises a toggle device with an internal spring and ball bearing locking mechanism. In one variation, the toggle shaped member includes arm guide barrel stopper pins with an end stop. The toggle comprises one or more springs, ball bearings and locking positions. The arm barrel stopper pin guides prevent the arms from deflecting left to right or in the x axis, so the levers or triggers do not slip off buttons of the game controller. The toggle is removably positioned in line with the arm guide and pins and is snapped onto the main top skin or base. The barrel stopper pin is affixed to a portion of the base part and configured to allow the arms to move freely and without restriction and without deflection. In one variation, the clicker toggle mechanism further comprises a spring with holes in the base part for locking the on/off positions. The clicker toggle mechanism is positioned under the controller and accessed with a finger flick motion for activation. The spring inside the clicker toggle mechanism is configured with round bearings that lock the desired position. In one variation, the clicker includes snaps at one end and an arm barrel stopper pin at another end. The arm barrel stopper pin is configured to stop the arm from traveling to far beyond the guide barrel stopper pin member. The screw member in the lever arm controls its distance infinitely by adjusting the screw inwards or outwards as desired to restrict motion. The clicker is configured to enable the lever arm to move inward and outward from in a smooth linear motion. In one variation, the clicker toggle and guides can be removed if the user desires not to use it.

In one variation, the user could activate the clicker toggle mechanism to make the buttons and triggers of the game controller more accessible for the user with the use of customizable levers. In one variation, the user could adjust the pull distance by rotating the screw members outwards and inwards from the lever arm. When the user clicks or flicks the clicker, it creates a rotational force on the cam which locks the snap to the base member to hold an interface in position, and wherein the clicker is released to create an open position that allows free movement of the lever arm and attached screw. The clicker toggle cam which unlocks the snap and allows free movement of the adjustable levers and full normal function of the triggers. The clicker barrel stopper pin prevents the arm from moving beyond a desired amount and is located on the arm which is connected to the trigger mechanism. The user could easily access the buttons on the top of the game controller using lever arm mechanisms and allows maximum control over the operation of the video game and not requiring them to remove their thumbs from the joysticks to turn the functions or buttons on or off which are located at various points on top, side and bottom of the device. The clicker toggle mechanism allows the user to respond quickly within less time, increase control in a myriad of gaming situations and enables differently-abled gamers to customize their controller to their best advantage.

Other objects, features and advantages of the invention will become apparent from the following detailed description. It should be understood, however, that the detailed description and the specific examples, while indicating specific variations of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

A description of variations of the invention will now be given with reference to the Figures. It is expected that the invention may be embodied in other specific forms without departing from its spirit or essential characteristics. The described variations are to be considered in all respects only as illustrative and not restrictive.

Figure 1:
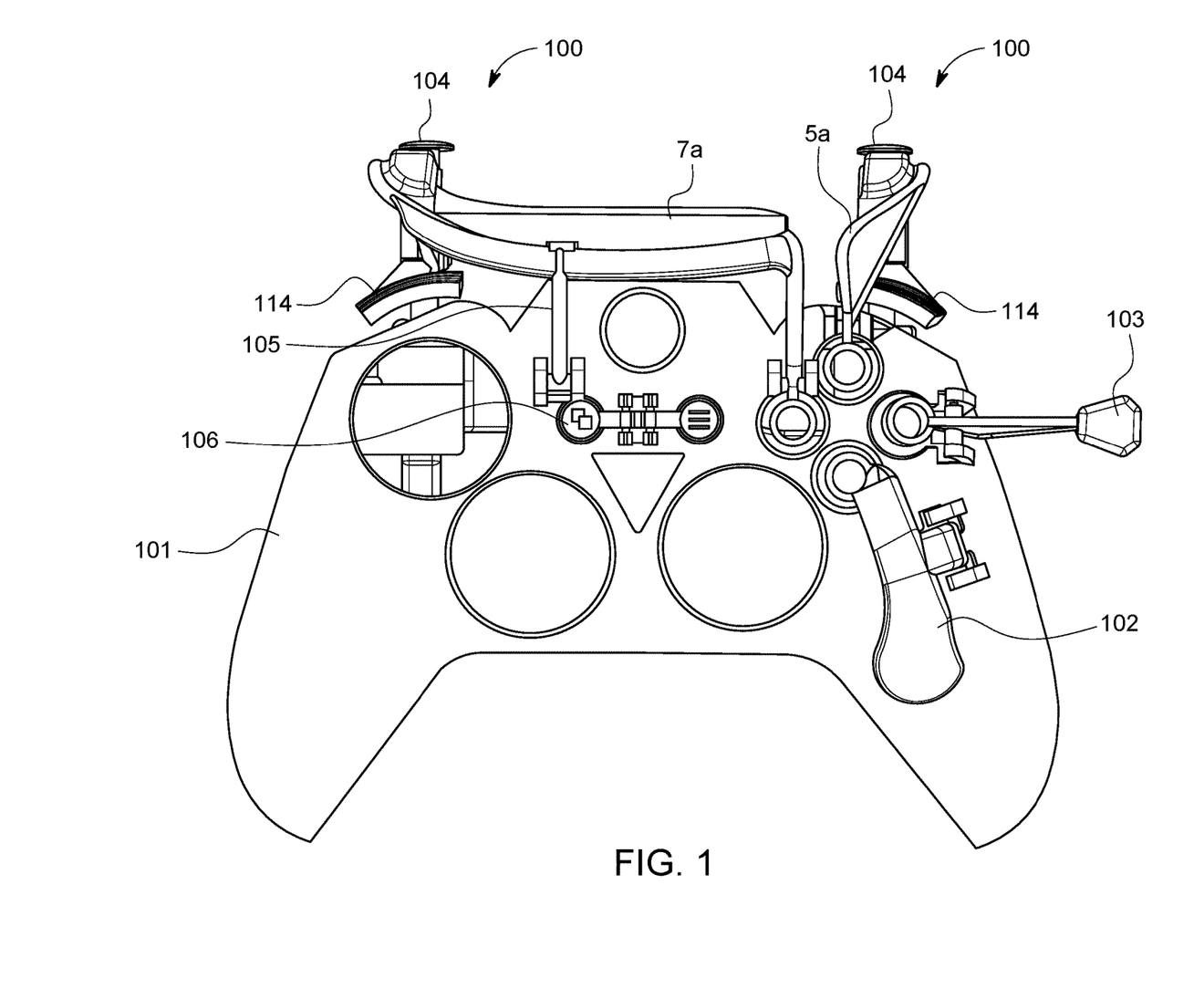
FIG. 1 shows a top perspective view of a clicker toggle mechanism system.

Referring to FIG. 1, a clicker toggle mechanism 100 customizable and fastened to a housing unit is disclosed. In one variation, the clicker toggle mechanism 100 is securely affixed to adjustable levers (5a and 7a) of the housing base unit 101 on both sides of a game controller or joystick via attaching members 112 (shown in FIG. 2). In one variation, the housing unit 101 is securely mounted on a game controller or joystick along with the respective position of one or more detachable and customizable removeable levers (5a and 7a) in reference to the buttons and triggers of the game controller. In one variation, the clicker toggle mechanism 100 is configured to make the buttons and triggers of the game controller more accessible for a user with the use of detachable levers (5a and 7a). In one variation, the clicker toggle mechanism 100 is further configured to prevent accidental activation of the levers or arms (5a and 7a) by the user while playing or resting the device on a flat surface. A rocker mechanism or toggle 106 that allows access to the top buttons. A toggle mechanism 103 that allows the side of the hand to activate a button. A paddle 102 that is activated using the palm of your hand to activate a button on the gaming controller.

Figure 2:
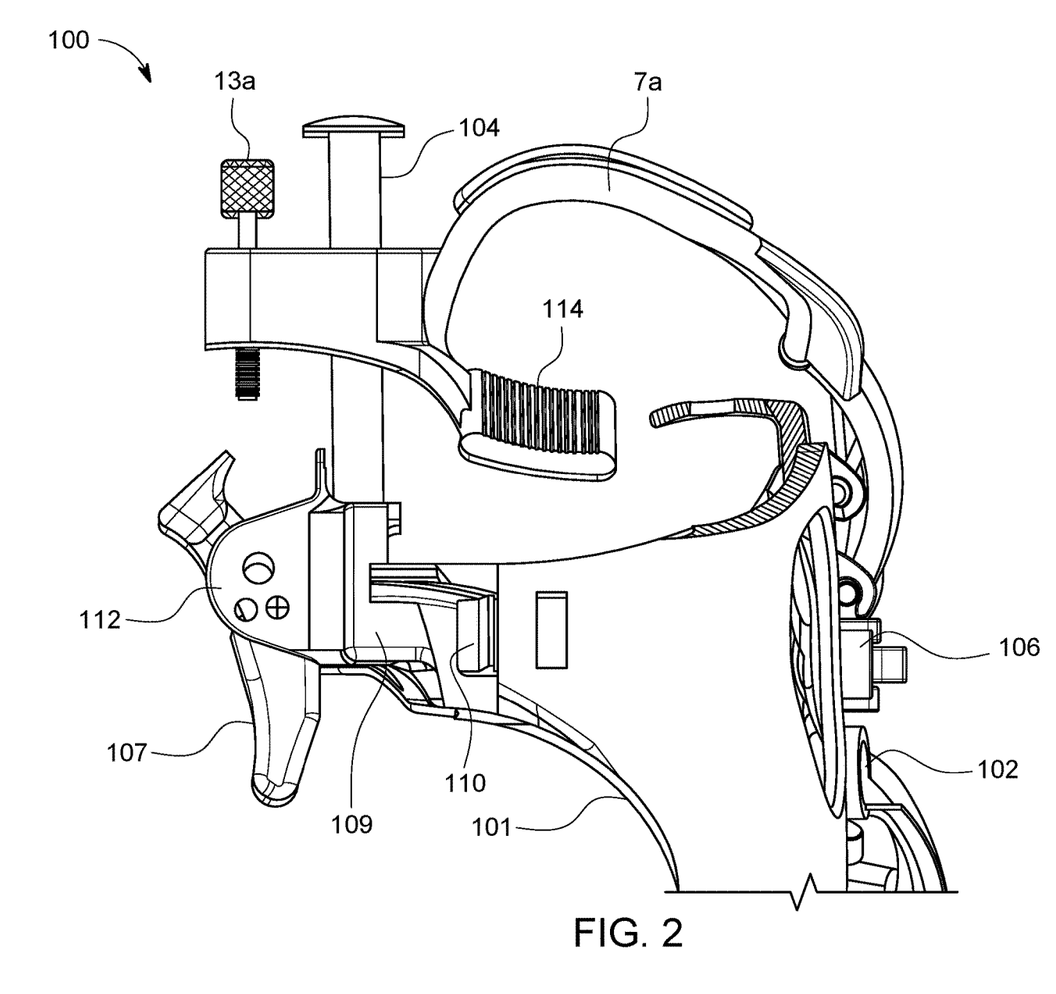
FIG. 2 shows a cross-sectional view of the clicker toggle mechanism, according to a variation of the invention.

Referring to FIG. 2, the clicker toggle mechanism 100 further configured to prevent excessive motion of the user's fingers and keeping thumbs on joysticks while using the game controller. In one variation, the clicker toggle mechanism 100 comprises a hole or oval shaped opening the armatures and toggle mechanisms to allow visibility of the button being used 102. The lever arm 114 is securely affixed to the lever arm 7a of the housing unit 101 of the game controller. In one variation, an adjustable screw member 13a is movable and threaded and affixed at a top portion of the armature member 114. Another screw member 13b for lever 5a with same configuration and works similar as screw member 13a for lever 7a, is shown in FIG. 2. Henceforth, the configuration and working mechanism explained for screw member 13b is applicable for screw member 13a and lever arm 114 and 5a (FIG. 1). The screw member 13b is configured to move outward and inward from the toggle member 107. In one variation, the clicker toggle mechanism 100 further comprises a stopper barrel guide 104 threaded with a cap to prevent excessive motion with a snap lock system 110 to secure it to the top base part 101. In one variation, the lever arm member 114 includes an arm guide hole which allows stopper barrel guide 104 to pass through it. The arm guides prevent the stopper barrel guide 104 from deflecting left to right or in the x axis so the levers or triggers (5a/114 and 7a/114) do not slip off buttons of the game controller. The stopper barrel guide 104 is removable and inserted into the lever arm member 114 from the bottom portion. Part 114 can be optionally removed as required by users. The adjustable screw member 13a is affixed to a bottom portion of the base piece 112 and stopper barrel guide 104 is affixed and configured to move along an opening in 114 (shown in FIG. 7) of the lever arm member 114. In one variation, the clicker toggle 107 further comprises a snap piece with holes for positioning and locking an on and off position with an internal spring and bearing interlock system. The base clicker holder and mechanism 112 is snapped onto and affixed to 101. The based part 112 can be removed by depressing a snap lock 110 and removed and replaced with part 109 (Shown in FIG. 11) to remove the clicker system entirely. In one variation, the clicker toggle 107 includes snaps to securely lock 101 to the gaming device. The lever arm distance stopper barrel guide 104 is configured to stop the lever arm member 114 from moving out of the stopper barrel guide 104. In one variation, the clicker toggle mechanism 100 further comprises a clicker toggle 107, positioned in line with the stopper barrel guide 104. The clicker toggle 107 is configured to enable the trigger distance stopper pin 13*a* to move inward and outward inside the barrel 104 and contacting the surface of the clicker toggle 107 when in the on or closed position. Alternately, clicker toggle 107 can be positioned in an open position and is locked in place to allow free full motion of part 114.

Figure 3:
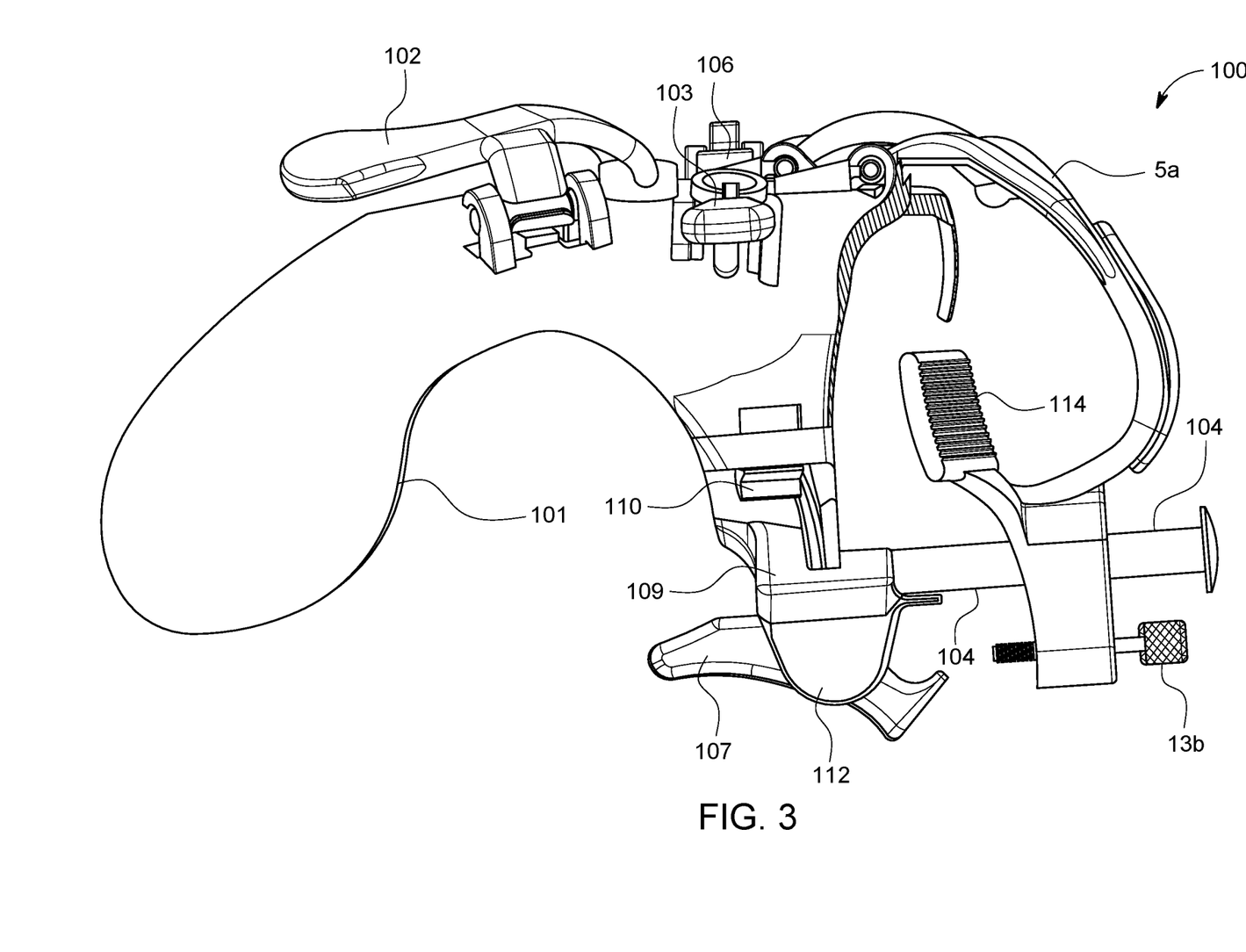
FIG. 3 shows a side view of the clicker toggle mechanism, according to a variation of the invention.
Figure 4:
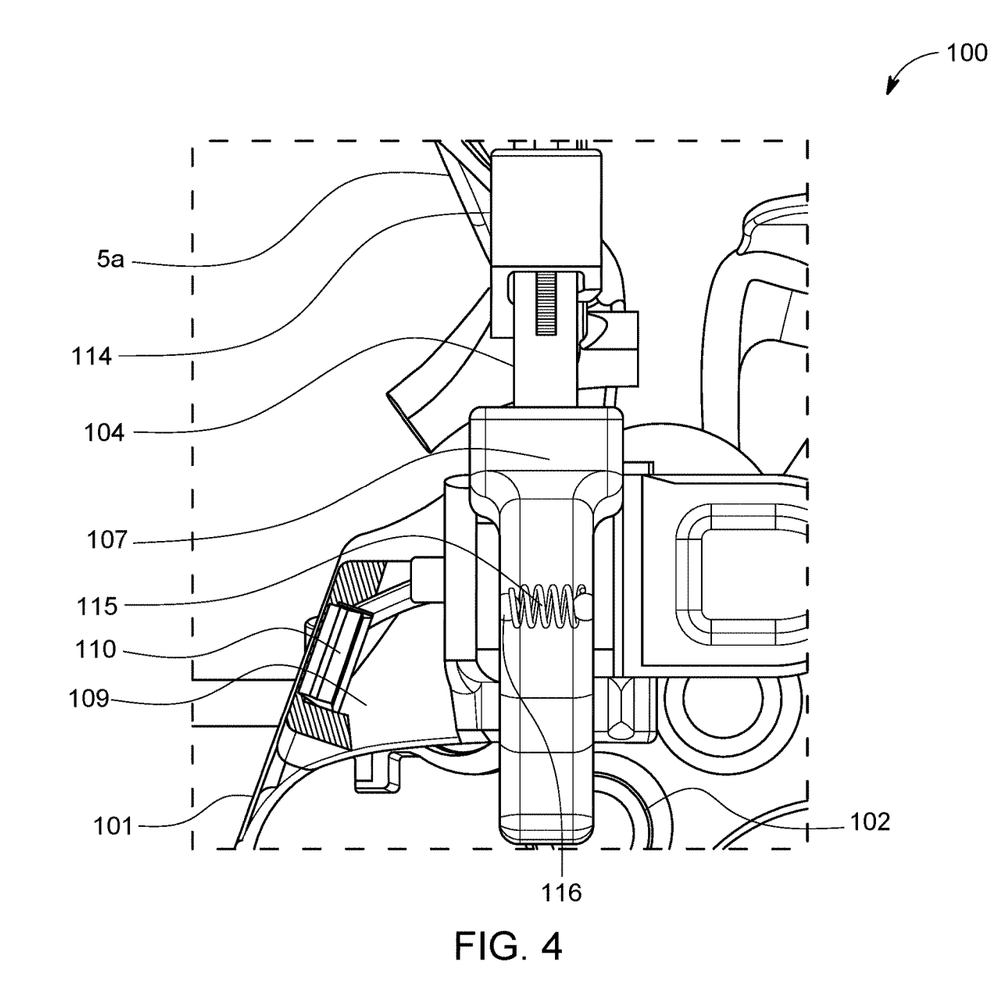
FIG. 4 shows a bottom perspective view of the clicker toggle mechanism, according to an variation of the invention.

Referring to FIG. 3, the clicker toggle mechanism 100 is activated via the clicker toggle 107 is disclosed. In one variation, the user could activate the clicker toggle mechanism 100 to make the buttons and triggers of the game controller more accessible for the user with the use of customizable and replacement of the levers (5*a*/114, 7*a*/114, 102, 103 and 106). In one variation, the user could adjust the pull distance by rotating the screw members 13*b* outwards and inwards from the lever arm member 114. When the user clicks or presses the clicker toggle 107 with fingers, it creates a rotational force on the clicker toggle 107 which locks the snap bearings and created an interference surface for the screw in member 13*b* to limit the distance the adjustable levers (5*a*/114 and 7*a*/114) can move, wherein the clicker toggle 107 is released to create a rotational force on the clicker toggle 107 which unlocks and opens to allow the screw member 13*b* normal range of motion of the adjustable levers (5*a*/114 and 7*a*/114). The screw member pin 13*b* prevents the lever arm base part 114 from moving out of the stopper barrel guide 104. The user could easily access the buttons on the game controller using the clicker toggle mechanism 100 and allows maximum control over the operation of the video game. The clicker toggle mechanism 100 allows the user to respond quickly within less time and shortens the reaction in the game which leads to increased control in a myriad of gaming situations and makes it possible for differently abled gamers to customize their controller to their best advantage and ease of use.

Figure 6:
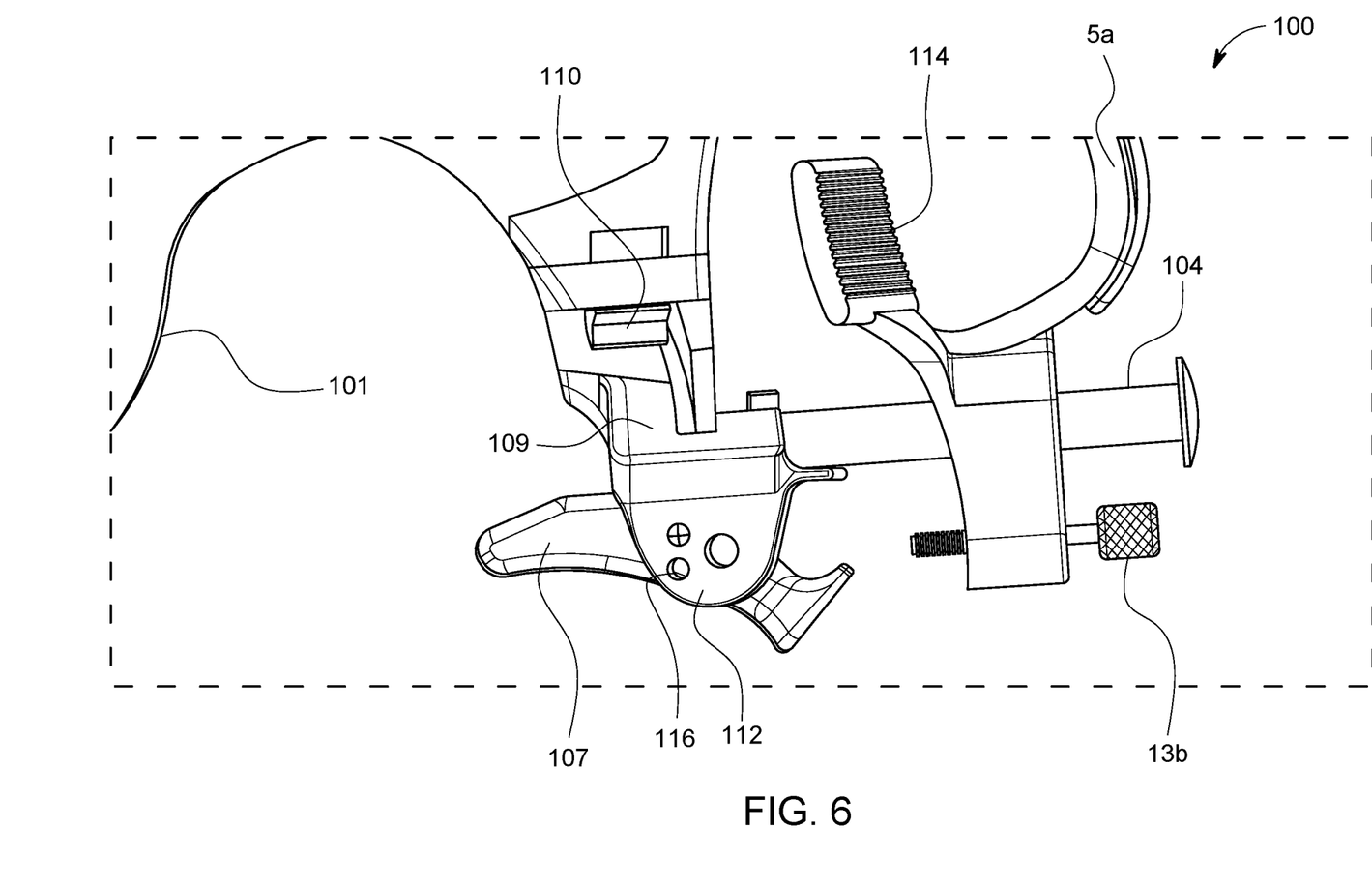
FIG. 6 illustrates a screw member attached to an armature or lever arm, according to an variation of the invention.
Figure 7:
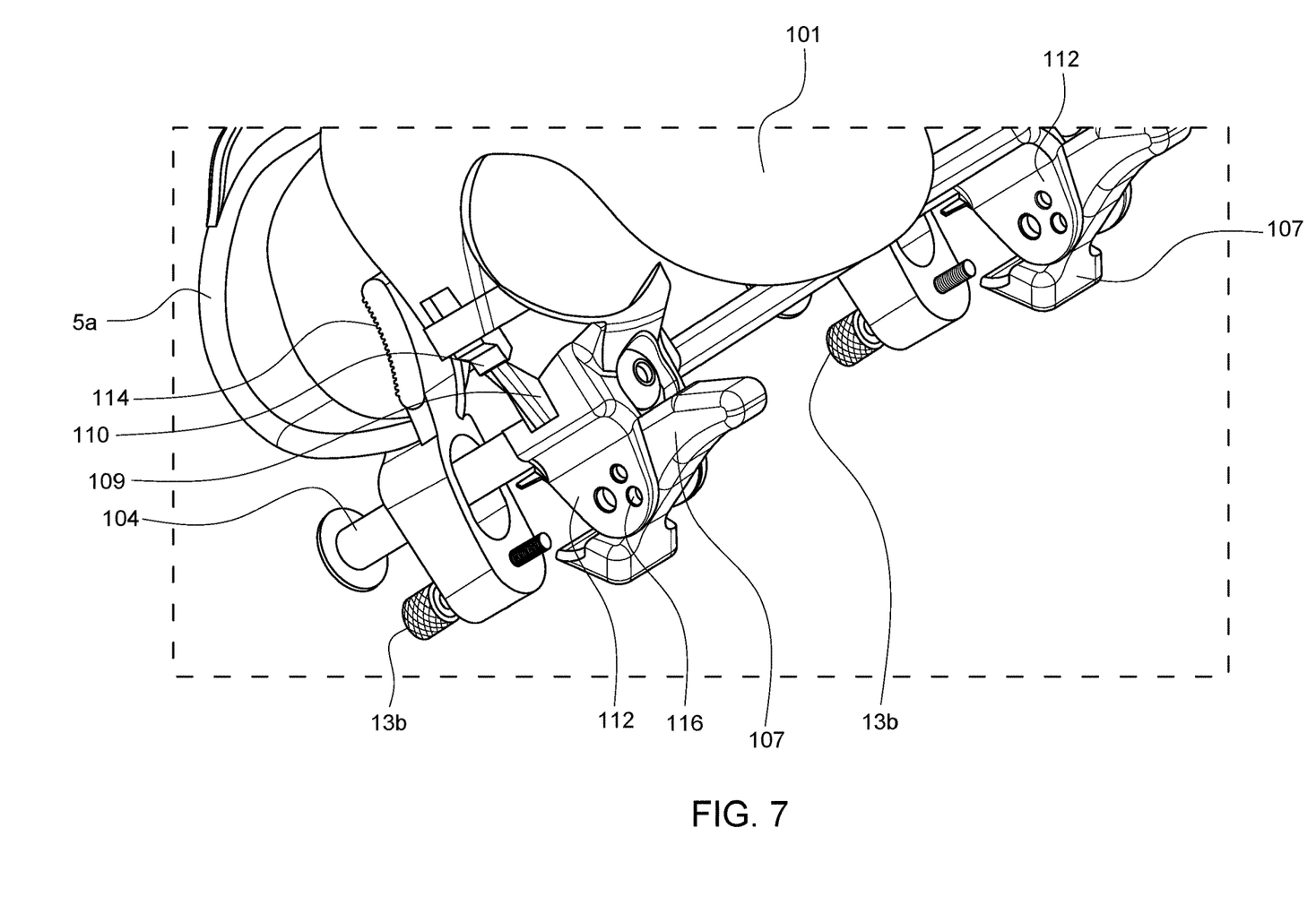
FIG. 7 shows a perspective view of the clicker toggle mechanism, according to a variation of the invention.

Referring to FIG. 4, FIG. 6, FIG. 7, and FIG. 9, arrangement, and operation of the clicker toggle mechanism 100 on activation and deactivation of the clicker toggle 107 is disclosed. In one variation, the clicker toggle mechanism 100 further comprises a spring 115, which is connected to a ball bearing 116. On pressing the clicker toggle 107, the spring 115 inside the base holder 109 member compresses and allows the clicker part 107 to rotate to a new position and lock in a hole 116 (as shown in FIGS. 6 and 7). The clicker toggle 107 connects the barrel stopper 104 and with the screw 13*b* when the user pulls on part 114. This mechanism restricts the lever 5*a* and 7*a* range of motion which is joined with lever arm base part 114 when a user applies an exertion of external force. This in turn fully extends the screw 13B in and follows the guide direction of stopper barrel guide 104 and can be infinitely adjusted to allow zero pull distance to free normal motion when clicker toggle 107 is moved to the second open position. To adjust the pull distance, the screw member 13*b* is rotated outwards or inwards by the user.

Figure 5:
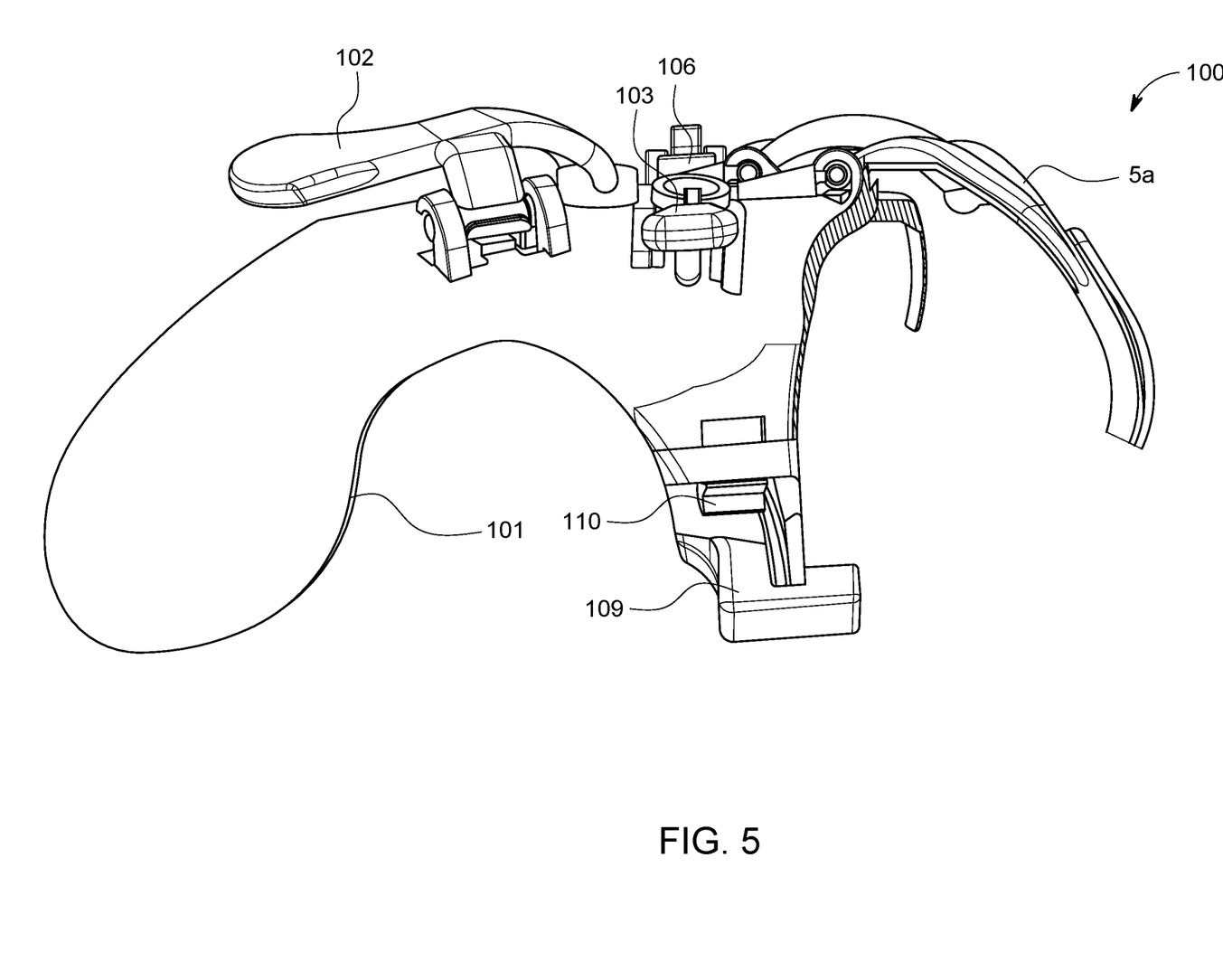
FIG. 5 shows a side perspective view of the clicker toggle mechanism, according to a variation of the invention with the clicker toggle mechanism optionally removed.
Figure 11:
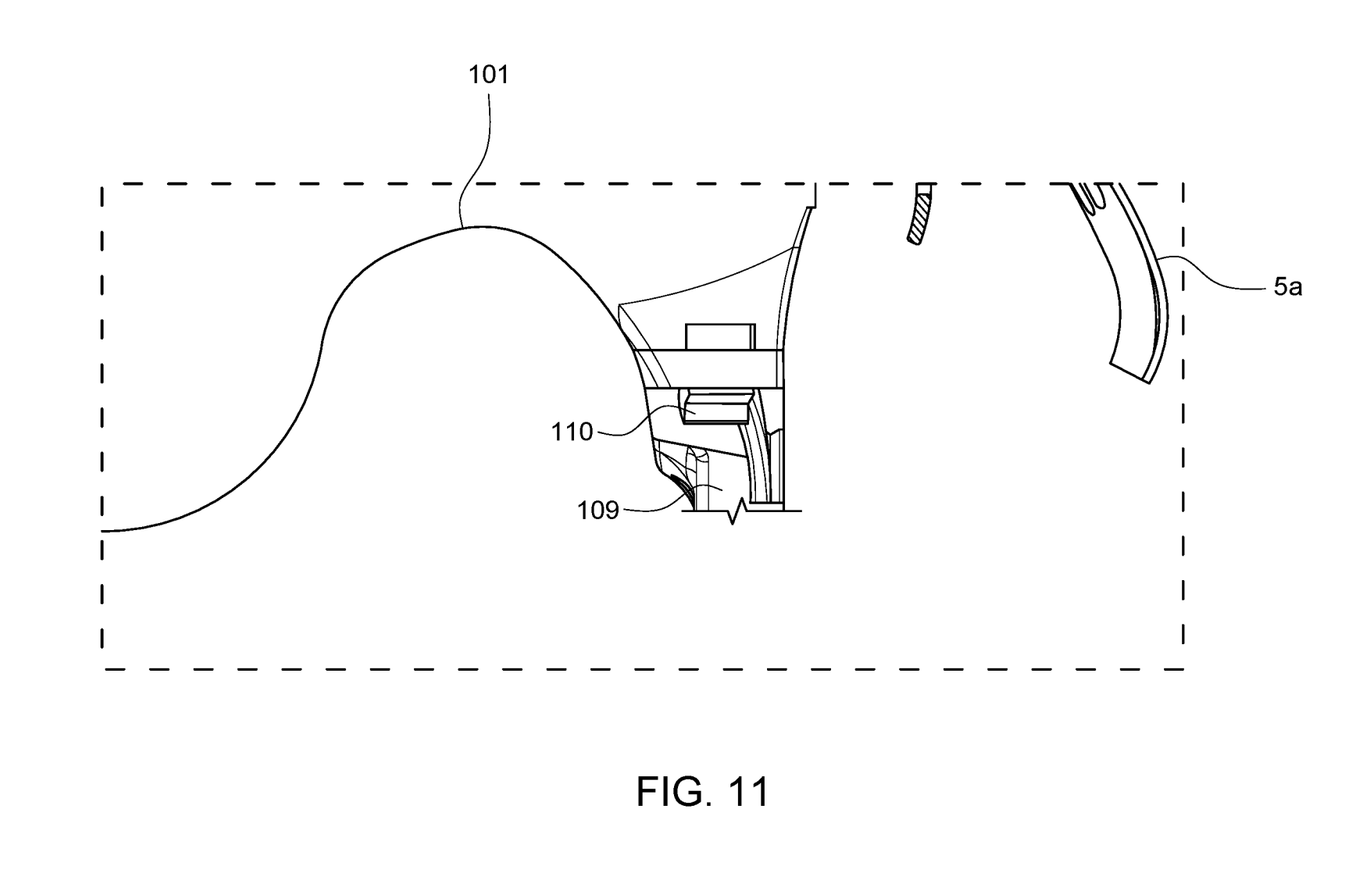
FIG. 11 shows a side view of the clicker toggle mechanism optionally removed, according to a variation of the invention.

Referring FIG. 5 and FIG. 11, illustrates when part 112, 107, 114, 104, 13*a* and 13*b* are removed. Releasing snap 110 and replacing with a basic locking bracket to secure the clicker toggle mechanism 100 and lever arms to the gaming device. This allows users full control on whether they wish to configure the trigger stroke controls, as shown in FIG. 2, FIG. 3, FIG. 4, FIG. 6, FIG. 7, FIG. 8, FIG. 9, and FIG. 10, or not to utilize them.

Referring FIG. 6, In one variation, the adjustable screw 13*b* is adjusted to a specific distance for limiting the pull distance. In one variation, the screw adjustment point is adjustable using trigger pull adjustment screw 13*b*. When the adjustable screw 13*b* hits the clicker toggle 107, it stops the clicker/trigger from being fully pulled in one direction. The trigger pad 114 provided at the distal end of the arm 5*a*, touches the stopper barrel guide 104 and retains its position relative to the clicker toggle 107. This current view in FIG. 6 shows the clicker toggle 107 in the open or full stroke unrestricted position. Pushing downward on clicker 107 move it to the movement limit by adding a barrier for the screw limit device 13*b* to come in contact with directly. During unlocking, the flat surface of the clicker toggle 107 is again pressed, which compresses the spring retained inside its body, thereby enabling the lever arm 114 and 5*a* to be restricted in its motion. The movement of 114 inside the barrel guide 104 and arm guide lever 114 allows for infinite stroke control during gameplay. In one variation, the user has the option to click the clicker toggle 107 is turned on or off during gameplay to provide full stroke or limited stroke as required.

In one variation, the stopper barrel guide 104 is configured to prevent the arm/taper-shaped member 114 from leaving the stopper barrel guide 104. In one variation, the arm 114 fits tightly in the x-axis, which prevents slipping off of arms 114 from the triggers or buttons on the device. In another variation, the shape of the arm 114 allows for radial motion without any binding. In another variation, the arm 114 hits stopper pin 13*b* and the flat surface of clicker toggle 107 the pull distance of arm 114 and 5*a* are limited.

Referring to FIG. 6, on releasing the clicker toggle 107, a space is created between the screw member 13*b* and the clicker 107, which is connected to the adjustable lever 114 and 5*a* that could be pulled to activate the trigger or button. Flicking the part 114 and 5*a* forward depresses the button on the top of the device without removing thumbs from the joysticks. In one variation, the force created by the spring 115 (shown in FIG. 4) is a smooth motion with a click sound on and off.

Figure 8:
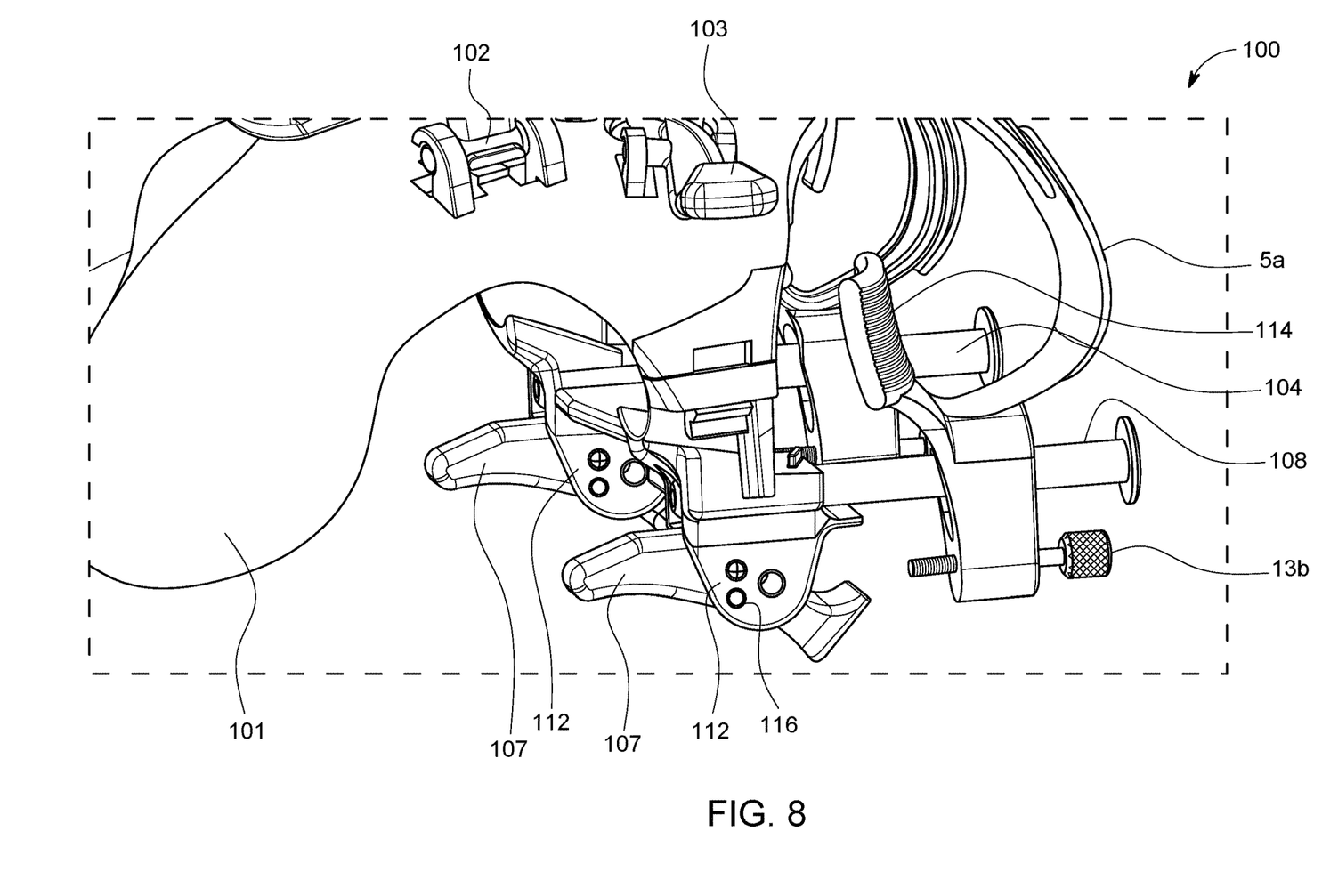
FIG. 8 shows a detailed view of the clicker toggle mechanism, according to a variation of the invention.
Figure 9:
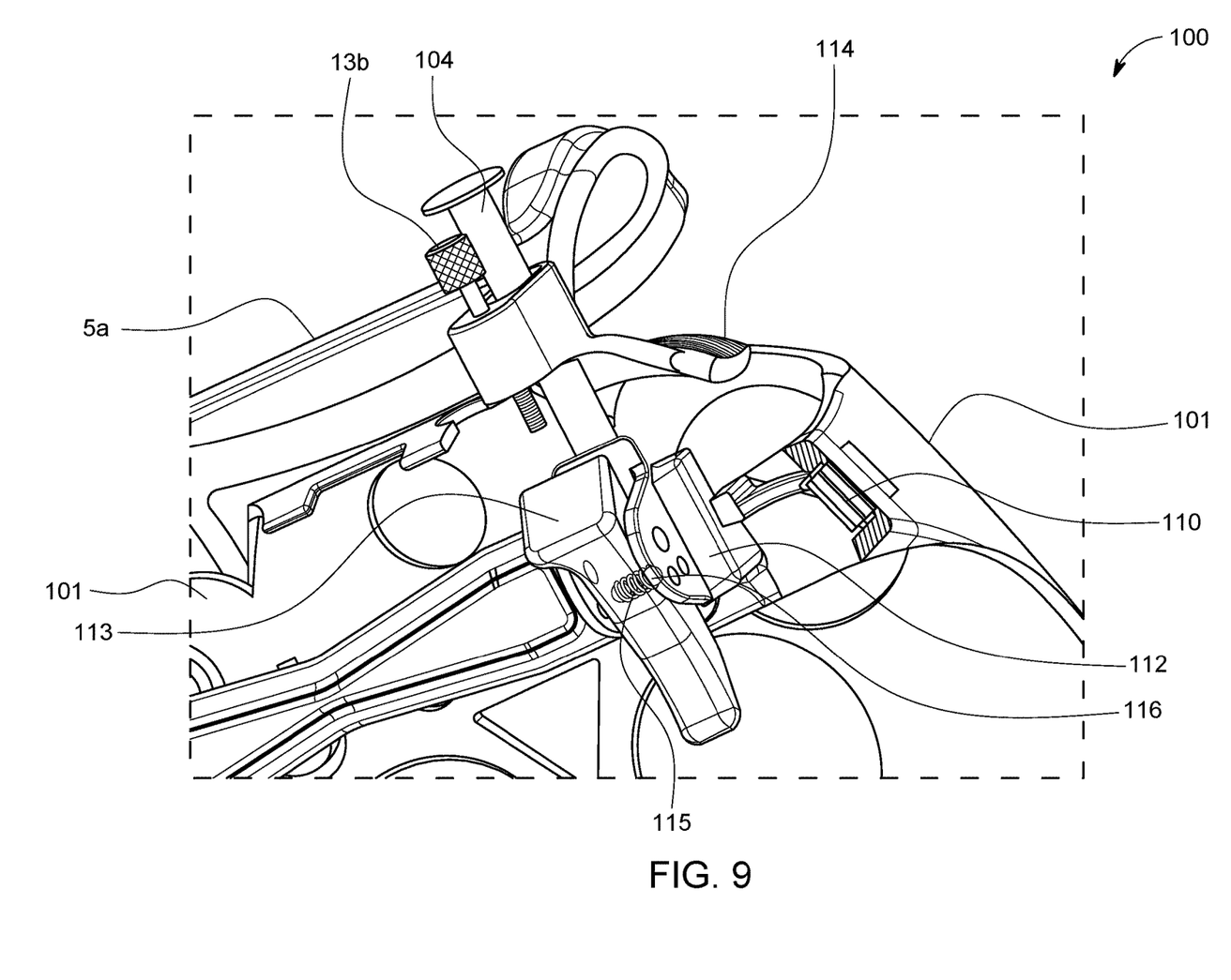
FIG. 9 shows a detailed view of the clicker toggle mechanism, according to a variation of the invention.
Figure 10:
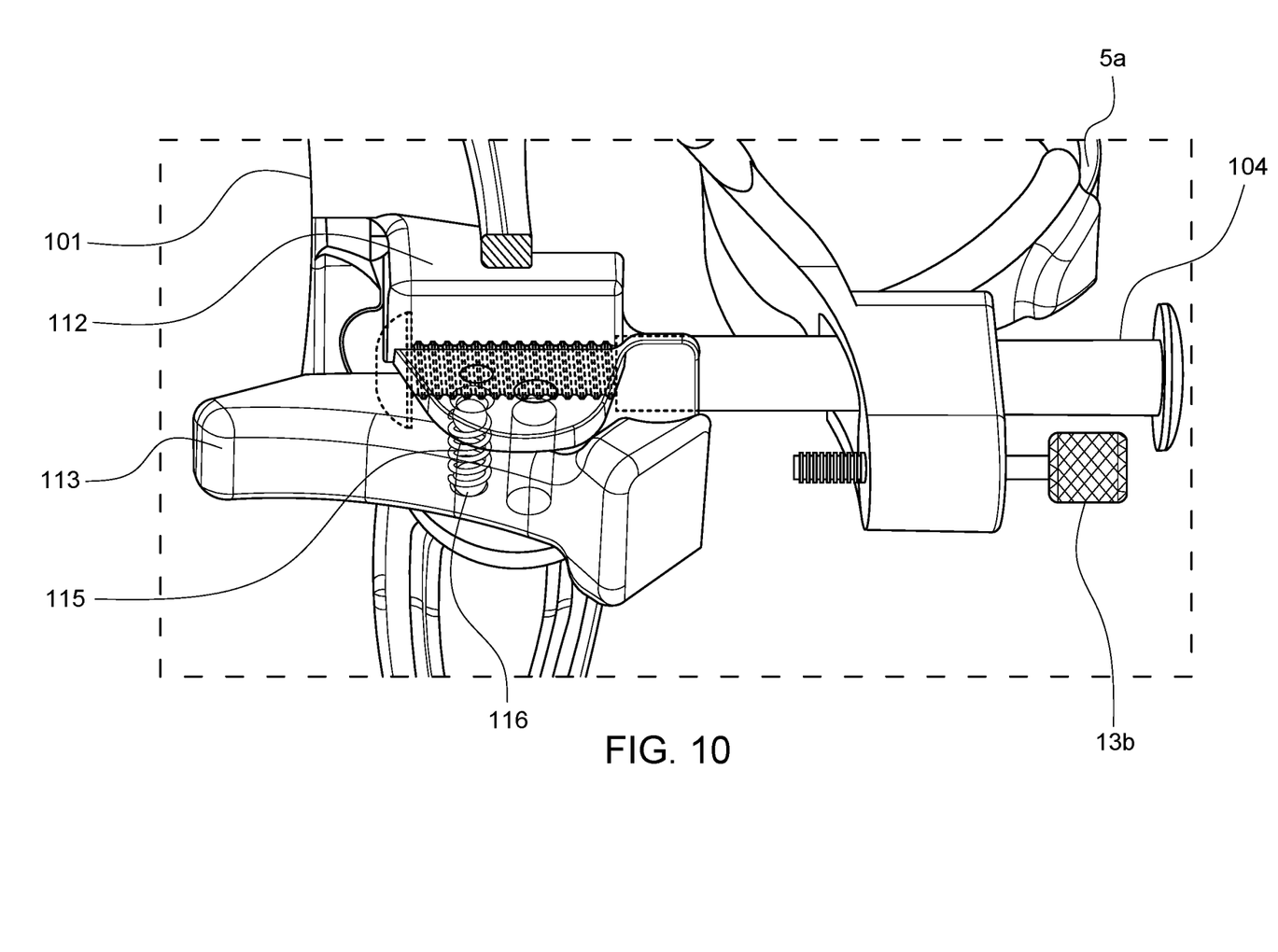
FIG. 10 shows an internal view of the clicker toggle mechanism, according to an variation of the invention.

Referring to FIG. 7, a stopper barrel guide 104 is configured to prevent the exit of arm 5*a* from the lever am member 114. In one variation, a loop of material/guide is provided to prevent the arm 5*a* from misalignment of 13*b* and 107 as it pushed forward and/or backward. In one variation, a tapered cut in lever arm member 114 is provided in the arms 5*a* and 7*a* which allows the arms to be easily inserted within the clicker toggle mechanism 100. The arms 5*a*, 7*a* and 114 could be replaced by the user. In one variation, the stopper barrel guide 104 is affixed to a bottom portion of the brace 112 and configured to move along the opening in 114. The stopper barrel guide 104 is made of material including, but not limited to; steel, plastic or any suitable material for smooth operation. FIG. 8 shows a detailed view of the clicker toggle mechanism 100, according to a variation of the invention.

The advantages of the invention include: the clicker toggle mechanism 100 is configured to prevent excessive motion of the user's fingers. This reduces reaction time during gameplay movements and character control. The clicker toggle mechanism 100 is minutely adjusted to fine tune the required pull distance to activate the game function on the screen during gameplay. The clicker toggle mechanism 100 allows incremental control of the triggers suited to the custom needs of the user while playing with game controllers.

Preferred variations of this invention are described herein, including the best mode known to the inventors for carrying out the invention. It should be understood that the illustrated variations are exemplary only and should not be taken as limiting the scope of the invention.

The foregoing description comprise illustrative variations of the invention. Having thus described exemplary variations of the invention, it should be noted by those skilled in the art that the within disclosures are exemplary only, and that various other alternatives, adaptations, and modifications may be made within the scope of the invention. Merely listing or numbering the steps of a method in a certain order does not constitute any limitation on the order of the steps of that method. Many modifications and other variations of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the invention is not limited to the specific variations illustrated herein.

What is claimed is:

1. A clicker mechanism for a video game controller, comprising:
   one or more levers, each lever configured to actuate at least one button of the video game controller;
   an armature member forming an end of each lever, the armature member being positioned to engage with a trigger of the video game controller when the armature member is pulled;
   a screw member disposed on the armature member;
   a clicker base having a clicker toggle, the clicker toggle having at least a first position and a second position; and
   a barrel guide adjacent to the clicker toggle;
   wherein in the first position, the clicker toggle is aligned to engage with the screw member to restrict a pull distance of the armature member when pulled, and wherein in the second position, the clicker toggle is aligned to not interfere with the screw member when the armature member is pulled.

2. The clicker mechanism of claim 1, wherein the barrel guide extends through and slidably engages with a guide hole in the armature member.

3. The clicker mechanism of claim 2, wherein the barrel guide restricts a motion of the armature member in an x-axis defined by a horizontal face of the video game controller.

4. The clicker mechanism of claim 1, further comprising a spring and bearing system coupled to the clicker toggle.

5. The clicker mechanism of claim 4, wherein the spring and bearing system engages with one or more holes in the clicker base to secure the clicker toggle in one or more positions.

6. The clicker mechanism of claim 1, wherein the screw member is threadably inserted into the armature member.

7. The clicker mechanism of claim 1, wherein the armature member is adjustable between zero pull distance to free normal motion by the screw member, wherein free normal motion is limited by a full trigger stroke of the video game controller.

8. The clicker mechanism of claim 7, wherein the screw member is configured to prevent excessive motion of a user's fingers while using the game controller by limiting the pull distance.

9. The clicker mechanism of claim 1, wherein the clicker base is removable.

10. A system comprising:
    a housing unit configured for attachment to a video game controller;
    one or more clicker mechanisms according to claim 1 disposed on the housing unit;
    one or more paddles disposed on the housing unit each configured to actuate one or more buttons of the video game controller.

11. The system of claim 10 further comprising a rocker to actuate two buttons of the video game controller alternately.

12. The system of claim 10 wherein the clicker base removably attaches to the housing unit with one or more snap locks.

* * * * *